United States Patent [19]

Wagner et al.

[11] Patent Number: 6,113,765
[45] Date of Patent: Sep. 5, 2000

[54] METHODS FOR ENHANCED RESOLUTION OF HYDROCARBON CONTINUOUS EMULSIONS OR DISPERSIONS WITH CONDUCTIVITY MODIFIERS

[75] Inventors: John P. Wagner, College Station; James B. Nelson, Hallsville, both of Tex.

[73] Assignee: The Texas A&M University System, College Station, Tex.

[21] Appl. No.: 09/173,994

[22] Filed: Oct. 16, 1998

Related U.S. Application Data

[60] Provisional application No. 60/063,743, Oct. 17, 1997.

[51] Int. Cl.⁷ .................................................. C10G 33/02
[52] U.S. Cl. ......................... 204/556; 204/567; 204/569; 205/696
[58] Field of Search ..................................... 204/555, 556, 204/567, 568, 569, 570; 205/695, 696

[56] References Cited

U.S. PATENT DOCUMENTS

| | | | |
|---|---|---|---|
| 3,644,187 | 2/1972 | Wilson .................................... | 204/186 |
| 4,149,958 | 4/1979 | Martin .................................... | 204/302 |
| 4,188,277 | 2/1980 | Martin .................................... | 204/190 |
| 4,391,698 | 7/1983 | Wagner .................................. | 204/302 |
| 4,409,078 | 10/1983 | Wagner et al. ......................... | 204/188 |
| 4,584,083 | 4/1986 | Wagner et al. ......................... | 204/280 |
| 4,992,210 | 2/1991 | Neager et al. .......................... | 252/389 |
| 5,154,857 | 10/1992 | Durrieu et al. ......................... | 252/338 |
| 5,250,174 | 10/1993 | Hart ........................................ | 208/188 |
| 5,256,305 | 10/1993 | Hart ........................................ | 210/708 |
| 5,660,717 | 8/1997 | Lindemuth ............................. | 208/251 |
| 5,876,589 | 3/1999 | Su et al. ................................. | 205/695 |

OTHER PUBLICATIONS

Wagner, J.P., Chapter 41: Charge Generation and Transport During Flow of Low–Conductivity Fluids, *Handbook of Fluids in Motion*, Eds. Cheremisinoff, Nicholas P. and Gupta, Ramesh, Ann Arbor Science (1983), month of publication not available.

Taylor, Spencer E., Investigations Into the Electrical and Coalescence Behavior of Water–in–Crude Oil Emulsions in High Voltage Electric Fields, American Institute of Chemical Engineers Spring 1986 Meeting, 86 Sp 93c (1986), month of publication not available.

Figueroa, Crescente E., Electrostatic Seperation of Liquid Dispersions: A Working Model and Application to Guayule Processing Technology, Bioengineering Doctoral Dissertation, Office of Graduate Studies, Texas A&M University (1993), month of publication not available.

Figueroa, Crescente E. and Wagner, John P., A Liquid Membrane Approach for Removal of Metallic Species from Resinous Extracts Under Imposed Electrical Fields, *Biosource Technology* 60, pp. 153–160 (1997), month of publication not available.

Rossetti, Salvatore J., Tutorial: Electrostatic Desalting Fundamentals, American Institute of Chemical Engineers Spring 1998 Meeting, 98 Sp 27a (Mar., 1998).

*Primary Examiner*—Kathryn Gorgos
*Assistant Examiner*—William T. Leader
*Attorney, Agent, or Firm*—Baker Botts L.L.P.

[57] ABSTRACT

A method of increasing the efficiency of the electrostatic separation of a continuous hydrocarbon emulsions or dispersion by increasing the electrical conductivity of the emulsion or dispersion. An increase in electrical conductivity is provided with an effective amount of an electrically conductive agent (conductivity modifier). Examples of electrically conductive agents are antistatic agents such as anionic, cationic, nonionic and amphoteric surfactants.

14 Claims, 7 Drawing Sheets

Block diagram of coalescence apparatus.

Conductivity enhancement of Isopar M using conductivity modifiers. Initial experiment to determine most efficient conductivity modifier.

Figure 1

Conductivity enhancement of real world crudes using CM#1. Test for effectiveness of conductivity modification.

Figure 2

Conductivity enhancement of real world crudes using CM#2. Test for effectiveness of conductivity modification.

Block diagram of coalescence apparatus.

Figure 5

Increased conductivity effect on coalescence of a Nigerian crude oil emulsion. Using CM #1 to increase the conductivity of the petroleum phase, coalescence was initiated at lower field strengths and greater rates of coalescence were seen at the same field strength.

Figure 6

Increased conductivity effect on coalescence of a Brunei crude oil emulsion. Once again, increasing the conductivity of the petroleum phase initiated coalescence at lower field strengths and exhibited greater rates of coalescence at the same field strength.

Figure 7

METHODS FOR ENHANCED RESOLUTION OF HYDROCARBON CONTINUOUS EMULSIONS OR DISPERSIONS WITH CONDUCTIVITY MODIFIERS

This application claims priority under 35 U.S.C. §119(e) from Provisional Application No. 60/063,743, filed Oct. 17, 1997.

FIELD OF THE INVENTION

The present invention relates to methods of separating emulsions or dispersions under imposed electrostatic fields and, more particularly, to methods of enhancing coalescence rates during electrostatic separation of emulsions or dispersions using conductivity modifiers.

BACKGROUND OF THE INVENTION

The use of electrostatic fields to separate hydrocarbon continuous emulsions or dispersions into organic and aqueous phases is well known in the separations industry. In the petrochemical or petroleum industry, electrostatic emulsion or dispersion separation is widely used in desalting crude oil before refining. Certain types of salts in crude oil are particularly detrimental to refinery equipment. Thus, the removal of impurities in crude oil is an important concern to the petroleum industry.

Desalting crude oil entails the formation of water-in-oil emulsions or dispersions by mixing a small quantity of water with a crude oil feed, usually at 4 to 10 percent of the crude oil feedrate, and then resolving the two-phase mixture in a vessel referred to as a "desalter." Impurites in the crude oil migrate to the entrained water droplets of the emulsion during such interaction. The water droplets eventually coalesce to form a distinct aqueous layer thereby providing a desalted crude oil layer ready for subsequent refining. However, to increase the rate of coalescence, desalters are normally equipped with electrodes to apply an electric field across the emulsion to polarize the water droplets.

Desalting apparatuses, including electrostatic desalters, require considerable capital expenditure. This is primarily due to their large size necessitated by the quantities of crude oil being desalted before refining can be commenced. Accordingly, considerable attention has been directed to improving the efficiency of petroleum desalters. One approach to increasing the efficiency of desalting operations is by using chemical additives such as demulsifiers and other desalting aids. Others have attempted to increase the efficiency of desalting operation by altering the design of the electrode assembly, the design of the desalter vessel, or both. While such attempts have improved the efficiency of desalting operations, there is still a continuing need in the art for increased efficiency levels due to the large quantities of crude oil that must be refined to satisfy current energy needs.

Accordingly, it is an object of the present invention to provide a method of increasing the efficiency of electrostatic emulsion or dispersion separation processes. In particular, it is an object of the present invention to provide a method of enhancing the coalescence rate of electrostatic desalting operations.

SUMMARY OF THE INVENTION

The present invention provides a method for increasing coalescence during electrostatic separation of a water-in-oil emulsion by measuring the electrical conductivity of the hydrocarbon phase material of said emulsion and increasing the electrical conductivity of said emulsion with an effective amount of an electrically conductive agent. After increasing the conductivity, an electric field is applied across the emulsion to facilitate coalescence of the emulsion into hydrocarbon and aqueous phase.

The electrically conductive agent is preferably soluble in the hydrocarbon phase and is a non-particulate (i.e., liquid). Examples of electrically conductive agents (also referred to as conductivity modifiers) are surfactants such as anionic surfactants, cationic surfactant, nonionic surfactant, amphoteric surfactants, and mixtures thereof. The electrically conductive agent is added to the hydrocarbon phase material prior to forming the emulsion or dispersion, or is added to the aqueous phase material. An effective amount of the electrically conductive agent provides the emulsion with an increase in conductivity of at least 25%, with an increase of at least 50% being preferred, and an increase of at least 100% being more preferred.

The hydrocarbon phase material of the emulsion are hydrocarbon material or materials having an initial conductivity of $1 \times 10^{-14}$ to $1 \times 10^{-8}$ Siemens/centimeter. Preferred hydrocarbon phase materials are crude oils, especially crude oils substantially free of an asphaltine fraction, and oil-containing sludges.

Optionally, the emulsion can be heated to optimize coalescence. Likewise, demulsifier and/or desalting agents can be added to enhance the electrostatic separation of the hydrocarbon continuous emulsion or dispersion.

DETAILED DESCRIPTION OF THE INVENTION

The present invention advantageously provides a method for increasing the coalescence rate of electrostatic emulsion or dispersion separation processes. The coalescence rate of a hydrocarbon-continuous emulsion (i.e., the rate at which the aqueous and organic phases disengage) in an electrostatic field has been discovered to be directly related to the electrical conductivity of the emulsion or dispersion. Thus, by increasing conductivity pursuant to the present invention, significant improvements in coalescence rates can be achieved by those skilled in the art.

In accordance with the present invention, the electrical conductivity of an emulsion is increased with an effective amount of an electrically conductive agent (i.e., a conductivity modifier). Emulsions to be modified in conductivity are preferably emulsions known in the art as "electrically conductive liquid emulsions." Emulsions falling into this category are hydrocarbon-continuous emulsions with the hydrocarbon phase having an initial conductivity (i.e., before the addition of the electrically conductive agent) of $1\times10^{-14}$ to $1\times10^{-8}$ Siemens/centimeter (S/cm or [ohm-cm]$^{-1}$), with $1\times10^{-12}$ to $1\times10^{-9}$ S/cm being preferred.

The electrical conductivity of the hydrocarbon phase can easily be ascertained using known measuring techniques such as those taught in J. P. Wagner, "Charge Generation and Transport During Flow of Low-Conductivity Fluids" *Handbook of Fluids in Motion*, Chapter 41, pp. 1093–1163, N. P. Cheremisinoff and R. Gupta, Editors, Ann Arbor Science (1983), which is incorporated herein by reference.

The electrically conductive agent is any conductive agent that is dispersible, and preferably dissolvable, in either the hydrocarbon phase or the dispersed aqueous phase of the emulsion or dispersion. Preferably, the electrically conductive agent selected is soluble in the hydrocarbon phase of the emulsion to optimize increases in the coalescence rate. To aid dispersibility, electrically conductive agents are preferably non-particulate (i.e., liquid) since particulate agents may become entrapped at the water: oil interface, thereby reducing the efficiency of the electrostatic separation.

Examples of electrically conductive agents to be used include conventional antistatic agents, such those used in plastic and light fuel applications. A brief description of such antistatic agents is found Kirk-Othmer's Encyclopedia of Chemical Technology, Volume 3, p. 540–576 (1992), which is incorporated herein by reference. Preferably, the antistatic agents are surfactants, which are particularly suitable due to their dispersibility in either phase of the emulsion. Functional classes of surfactants to be used are anionic surfactants, cationic surfactants, nonionic surfactants and amphoteric (zwitterionic) surfactants. Examples of anionic surfactants include, but are not limited to, carboxylates, phosphate, sulfonates and sulfates with $C_9$–$C_{30}$ linear chains. Examples of cationic surfactants include, but are not limited to, quaternary ammonium or phosphonium compounds with $C_9$–$C_{30}$ linear chains. Examples of amphoteric surfactants include, but are not limited to, amino acids, amino acid derivatives and imidazolinium derivatives. Examples of nonionic surfactants include, but are not limited to, polyoxyethylene compounds (ethoxylates), carboxylic acid esters, glycol esters of fatty acids, and carboxylic amides. A detailed listing of surfactants which may be used in accordance with the present invention is found in Kirk-Othmer's Encyclopedia of Chemical Technology, Volume 23, p. 478–541 (1997), which is incorporated herein by reference.

As previously described, an effective amount of the electrically conductive agent is used to increase the conductivity of the emulsion and, more preferably, to increase the conductivity of the continuous hydrocarbon phase. While an effective amount of the electrically conductive agent can be added to the dispersed aqueous phase to increase conductivity, increasing the conductivity of the majority phase (i.e., the hydrocarbon phase) provides the greatest potential for increasing the coalescence rate during electrostatic separation. An "effective amount" in this context means an amount of the agent that provides at least a 25% increase in the conductivity, with at least a 50% increase being preferred, and a 100% increase being more preferred. If desired, increases in conductivity of 500%, 1000% or greater are easily achievable by those skilled in the art.

As will be apparent to the skilled artisan, the actual amount of the electrically conductive agent necessary to provide an effective amount is dependent on a variety of factors. Such factors are the initial conductivity of the hydrocarbon liquid, the ionization behavior of the agent, the solubility of the agent in the hydrocarbon phase, and the temperature of the hydrocarbon phase. Thus, the actual amount of the agent required to provide a specified increase in conductivity will vary from agent to agent (e.g., an anionic surfactant versus a cationic surfactant). The above-described parameters for determining an effective amount of the electrically conductive agent can easily be ascertained by those skilled in the art following the procedure described in the examples set forth below.

For illustrative purposes, the amount of the electrically conductive agent used can range from 1 to about 300 parts per million (ppm) of the emulsion, with 5 to 150 ppm being preferred, and 10 to 100 ppm being more preferred. Such a range is preferred in petroleum desalting operations to minimize additive concentration in the desalted crude The electrically conductive agent (i.e., conductivity modifier) is added in one of three manners: 1) the agent is added to the hydrocarbon phase material before forming the emulsion or dipersion; 2) the agent is added to the aqueous phase material before forming the emulsion or dispersion; or 3) the agent is added to the emulsion or dispersion. Preferably, the electrically conductive agent is added to the hydrocarbon phase material prior to forming the emulsion to maximize dispersal within the phase. Thus, for example, in a petroleum desalting operation, the electrically conductive agent is added to the crude oil feedstock, prior to mixing with the wash water feed upstream of the desalting vessel.

In accordance with the present invention, the hydrocarbon phase material is any liquid hydrocarbon with an initial conductivity of $1\times10^{-14}$ to $1\times10^{-8}$ S/cm, with $1\times10^{-12}$ to $1\times10^{-9}$ S/cm being preferred. Examples of hydrocarbon phase materials to be used in accordance with the present invention are crude oils and crude oil-containing sludges. In petroleum desalting operations, the hydrocarbon phase material is preferentially crude oil substantially free of the asphaltine fraction as in crude oils that are commonly classified as light and intermediate crudes. Asphaltines, which are highly conductive, are typically found in heavy crudes at around the 10% percent range or higher. Thus, the asphaltine fraction within the context of the present invention is preferentially removed from the crude feedstock prior to desalting of the non-asphaltine fraction to optimize increased coalescence during electrostatic separation.

The aqueous phase material is water, or a combination of water and water-soluble or water-miscible solvents. Preferably, the aqueous phase material has an electrical conductivity greater than $1\times10^{-7}$ S/cm, with greater than $1\times10^{-5}$ S/cm being more preferred, to optimize increased coalescence.

In accordance with the present invention, the emulsion can be optionally heated during electrostatic separation to increase dissolution rates of the electrically conductive agent. Likewise, the hydrocarbon and aqueous phase materials can be heated prior to forming the emulsion to reduce the viscosity of the majority hydrcarbon continuous phase.

Apparatuses and methods for electrostatic emulsion separation, as exemplified by petroleum desalting, are well known to those skilled in the art. Representative examples of electrode assemblies and desalter vessels to be used in accordance with the present invention are disclosed in U.S. Pat. Nos. 4,149,958, 4,188,277, 4,391,698, 4,409,078 and 4,584,083, which are incorporated herein by reference.

Optionally, various demulsifiers and desalting aids known in the art can be used in conjunction with the electrically conductive agents of the present invention. Representative examples of demulsifiers and other desalting aids to be use in accordance with the present invention are disclosed in U.S. Pat. Nos. 4,992,210, 5,154,857, 5,250,174, 5,256,305 and 5,660,717.

The following non-limiting examples illustrate the application of the present invention to petroleum desalting operations.

EXAMPLES

Example 1

Initial screening of conductivity modifiers 1 to 4 (CM#1–CM#4, see Table 1) was performed using Isopar M, a highly refined iso-paraffinic oil produced by Esson. A listing of the active components in each conductivity modifier is listed in Table 1.

TABLE 1

Conductivity Modifier Data

| Conductivity Modifier | Trade Name | Manufacturer | Active Ingredient |
|---|---|---|---|
| #1 | ASA-3 | Royal Lubricants Co., Inc. (Royal Dutch Shell) | Chromium Dialkysalcilate & Calcium Dioctylsulfosuccinate |
| #2 | Stadis 425 | Octel America | Dodecylbenzene Sulfonic Acid & proprietary compounds |
| #3 | Mobil ADD | Mobil Chemical Co. | Proprietary, non-metallic |
| #4 | 12% Iron Napthanate | Akcros Chemicals, Inc., ALFA Aesar, and others | Iron tris(cyclohexane carboxylate) 12% |

Conductivity measurements were obtained using the same cell as described in Chapter 41 by Wagner in the advanced monography by Chermisinoff and Gupta (J. P. Wagner, in "Handbook of Fluids in Motion," N. P. Cheremisinoff and R. Gupta, ed., Ann Arbor Science, Ann Arbor, Mich., p. 1093 (1983)), which is incorporated herein by reference. For baseline tests, the cell was filled with 200 mL of Isopar M and voltage (V) is applied using a LKE Bromma D.C. Power supply (20–300 volts) or an Eveready Mini-Max Number 423, 300 volt battery. Output voltage was monitored with a Universal Enterprises DVW1 multimeter. Current was measured with an attached Kiethly 610C electrometer. Readings were taken manually at 1 second, 2, 5, 10, 15 ad libitum until the current remained constant. For more accurate readings, the data were collected at 0.1-second intervals under computer control using Virtual Bench software from National Instruments.

When voltage was applied, current (I) initially rose with time (t), then became constant. For dielectric liquids in the conductivity range below $10^{-12}$ (ohm cm)$^{-1}$, the shape of the I vs. t curve is characteristic. The current rose to a peak value, then decayed to a constant value of I, referred to as the terminal amperage ($I_{terminal}$). This decay curve appears exponential, but in fact deconvolutes into three constituent exponential decay curves, each with a measurable decay constant and zero time amperage ($I_{t=0}$). The first component decay was detectable in the first two second constituent decay was usually evident in the time frame of 2 seconds to 2 minutes. It was this second constituent decay curve which yields the conductivity (K) of the dielectric liquid. The gradual decay curve was extrapolated back to time zero to obtain the value of $I_{t=0}$. A third decay was observed as the current approached $I_{terminal}$, typically with a half-life greater than two minutes. For liquids with a conductivity greater than $10^-$ (ohm cm)$^{-1}$, a single exponential decay was exhibited, simplifying extrapolation to $I_{t=0}$.

Corrections involving the dimensions and configuration of the cell were made by standardizing the equipment with materials of known conductivity. These corrections are embodied in the cell constant, C, found to be 0.05148 cm$^{-1}$ for this cell. The extrapolated value of $I_{t=0}$ was used in Ohm's law to calculate conductivity, K, and corrected with C, as shown.

$$K = \text{Conductivity} = \frac{I_{t=0} C}{V}$$

The above-described conductivity modifiers were supplied as dilute solutions of the active ingredient in an inert solvent. As will be apparent to those skilled in the art, the commercially available conductivity modifiers may exhibit variations in the concentration of inert solvent and changes in the activity from batch-to-batch and manufacturer-to-manufacturer. For these reasons, concentration of the additive was expressed as total additive concentration (TAC). A solution of 10 ml of the conductivity modifier diluted to $10^6$ ml of Isopar M is referred to herein as a 0.0001% solution, or 10 ppm, regardless the concentration of the active ingredient in the commercial product. Per manufacturer data, the active ingredient was estimated to be 10% of the total product. The commercial product was diluted to 10% v/v in Isopar M. This was further diluted to 1%. One calibrated drop (0.0015 ml=15 μl) of the 1% solution was added to the 200 ml in the conductivity cell and mixed well for three minutes making a v/v concentration (ppm) of 0.075 ppm. The conductivity (K) was measured as described above and the process was repeated by adding more of the 1% solution. To test higher concentrations, various amounts of the 10% solution were used and then drops of the undiluted conductivity modifier until a cumulative additive concentration of 200 ppm is realized. The conductivity was calculated, and data were plotted as equivalent conductivity, (conductivity of the solution at given concentration of conductivity modifier divided by the concentration of conductivity modifier, W=K/ppm, versus log ppm). The units of equivalent conductivity were listed as mho/cm-ppm, which is equivalent to S/cm-ppm and (ohm cm)$^{-1}$/ppm.

Figure 1:
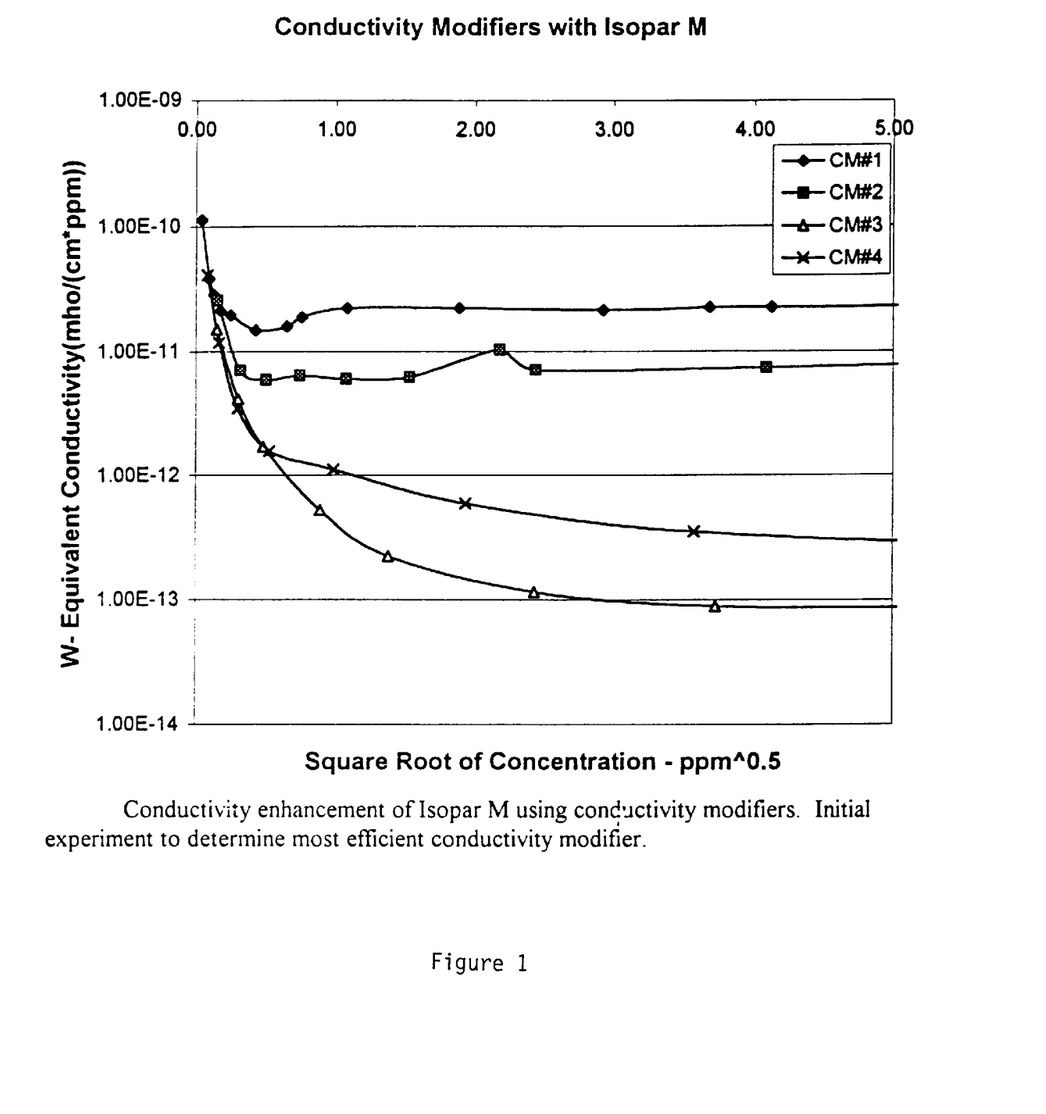
FIG. 1 is a plot graph depicting the effect of four conductivity modifiers (CM1, CM2, CM3 & CM4) on the equivalent conductivity of isoparaffinic oil (Isopar M) as a function of the square root of modifier concentration.

The results of the incremental addition of the conductivity modifiers to Isopar M are shown in FIG. 1. The data presented in Figure were expressed in terms of total additive concentration, TAC, expressed in ppm$^{-\frac{1}{2}}$, and equivalent conductivity, W, expressed in mho/cm-ppm. As previously stated, equivalent conductivity was used for comparative purposes in determining the most effective conductivity modifier. Initial conductivity of the Isopar M was $1.6 \times 10^{-14}$ mho/cm (S/cm), with successive additions of additive increasing the conductivity to $10^{-7}$ mho/cm. Increases beyond this point were not considered efficient (i.e., very large amounts of the conductivity modifier were needed to effect small conductivity changes). Using FIG. 1 as a guide, effective conductivity modifiers have a higher equivalent conductivity, meaning that less modifier is needed to bring about a substantial change in the conductivity. Useful conductivity modifiers were considered to be those yielding plots that "leveled off" at or above an equivalent conductivity of around $10^{-11}$ mho/cm-ppm, which were CM#1 and CM#2. Thus, FIG. 1 demonstrates that CM#1 and CM#2 were significantly more effective than #3 and #4 in increasing conductivity.

Example 2

Conductivity modifiers that were identified as having the greatest potential to increase conductivity in Isopar M (CM#1 & CM#2) were tested using three different real world petroleum crude oils provided by NATCO, following the procedure in Example 1. Samples of Nigerian (intermediate), Venezuelan (intermediate) and Shell Brunei (light) crude oils were used to obtain equivalent conductivity plots following the procedure as described above. Characteristics of the oils are listed in Table 2.

TABLE 2

Characteristics of Crude Oils

| Crude Oil Sample | Conductivity (mho/cm) | Viscosity (cSt) |
|---|---|---|
| Shell Brunei | $3.0–3.5 \times 10^{-11}$ | 2.73 |
| Nigerian Light | $4.5–5.0 \times 10^{-9}$ | 6.35 |
| Venezuelan | $1.0–1.5 \times 10^{-8}$ | N/A |

Figure 2:
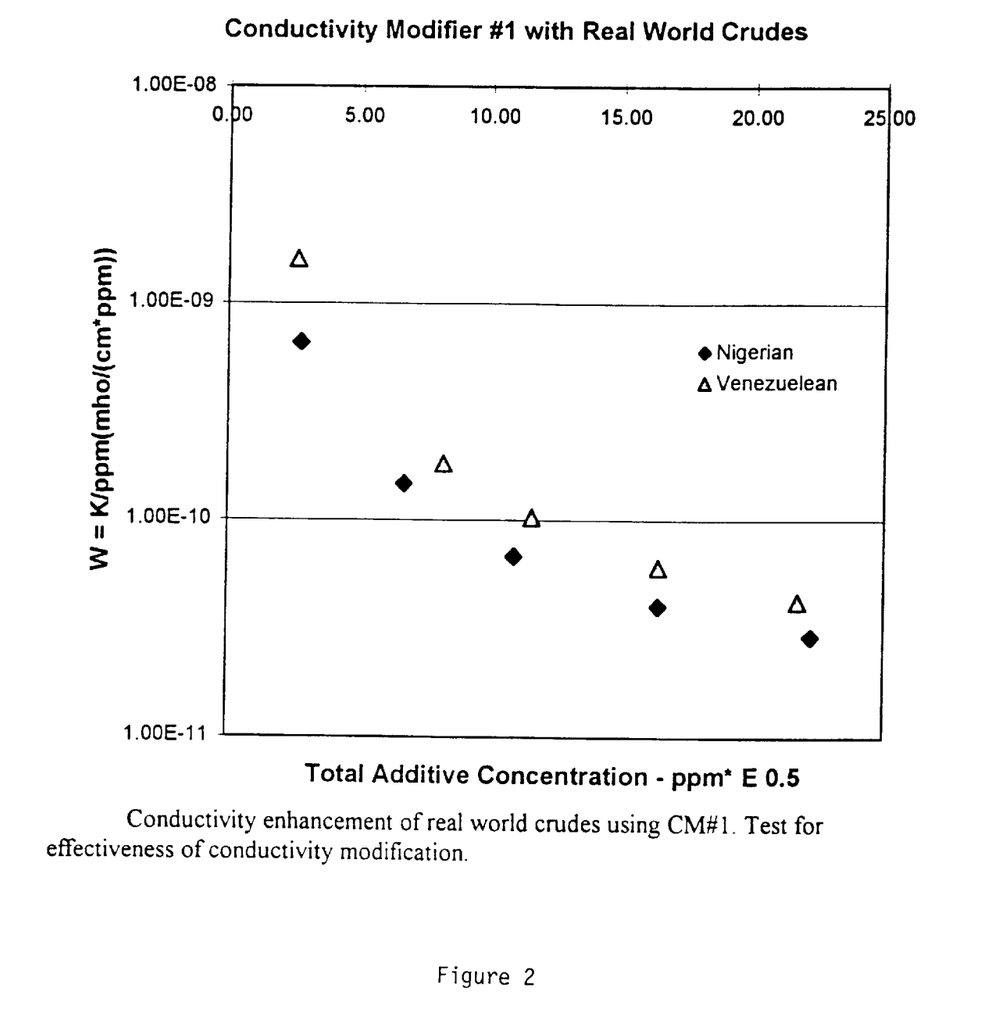
FIG. 2 is a plot graph depicting the effect of CM1 on the equivalent conductivity of Nigerian and Venezuelan crudes as a function of the square root of modifier concentration.
Figure 3:
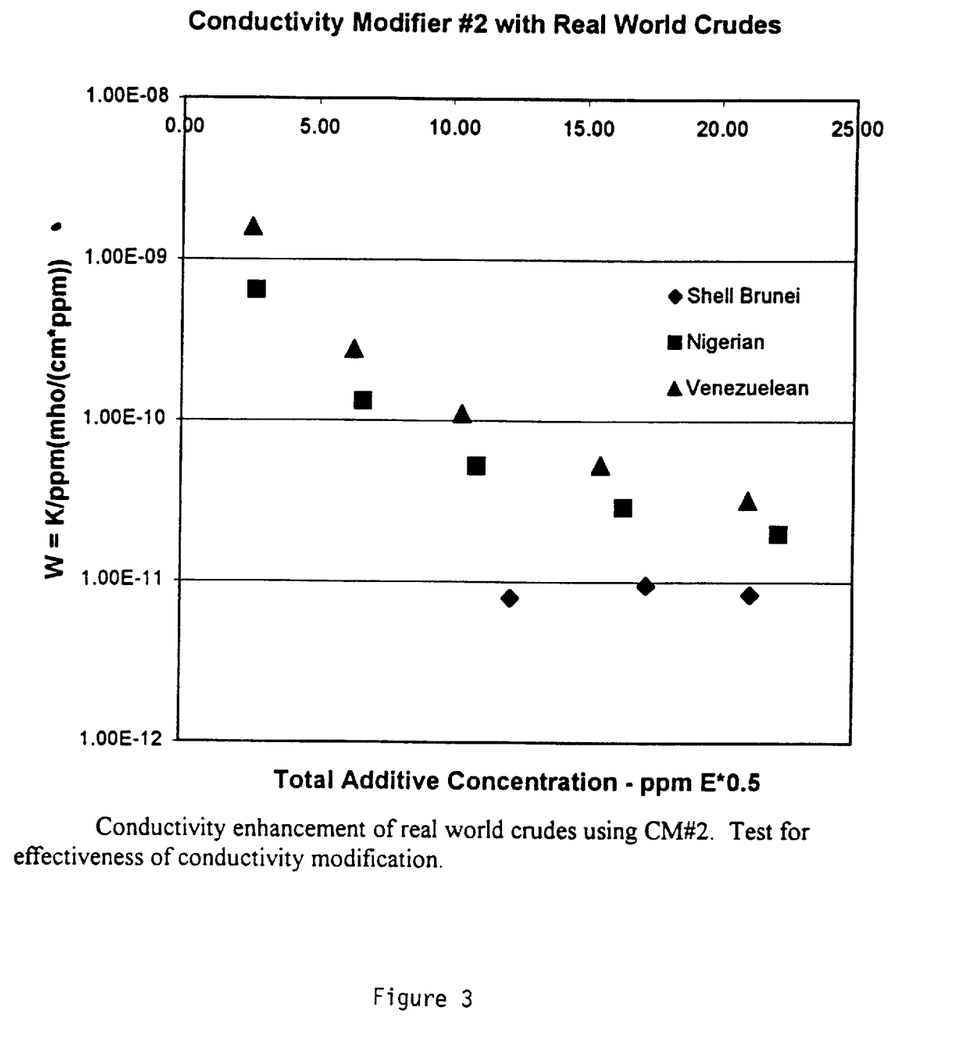
FIG. 3 is a plot graph depicting the effect of CM2 on the equivalent conductivity of Shell Brunei, Nigerian and Venezuelan crudes as a function of the square root of modifier concentration.

The results of the addition of CM#1 to Nigerian and Venezulan cudes are shown in FIG. 2. The results of the addition of CM#2 to Shell Brunei, Nigerian and Venezulan crudes are shown in FIG. 3. Both modifiers produced the same type of curves. However, after comparing the actual conductivity modification results CM#1 was determined to be slightly more effective than CM#2.

Example 3

The effect of CM#1 on the coalescence rates of real world crude oils in electrostatic resolutions of crude oil emulsions was determined. Emulsions of Shell Brunei and Nigerian crudes were prepared and tested as follows.

Emulsion Preparation

A six-liter stainless container was charged with 20.4 grams of the surfactant (Paranox 147) and 3400 grams of the respective crude. The surfactant was dissolved with mild heating and stirring, with pre-measured quantities were blended at this point. One hour before use, the solution was stirred with a Janke and Kunkel turret mixer at 9500 Rz for five minutes. Two hundred and eighty milliliters of the aqueous phase were added in ten seconds, and stirring was continued for ten minutes. A sample of the emulsion was drawn, and the electrical conductivity determined as in Example 1. The emulsion was transferred to the feed tank and stirred with a magnetic bar until the coalescence test was completed using the coalescence cell described below.

Coalescence Cell Description

Figure 4:
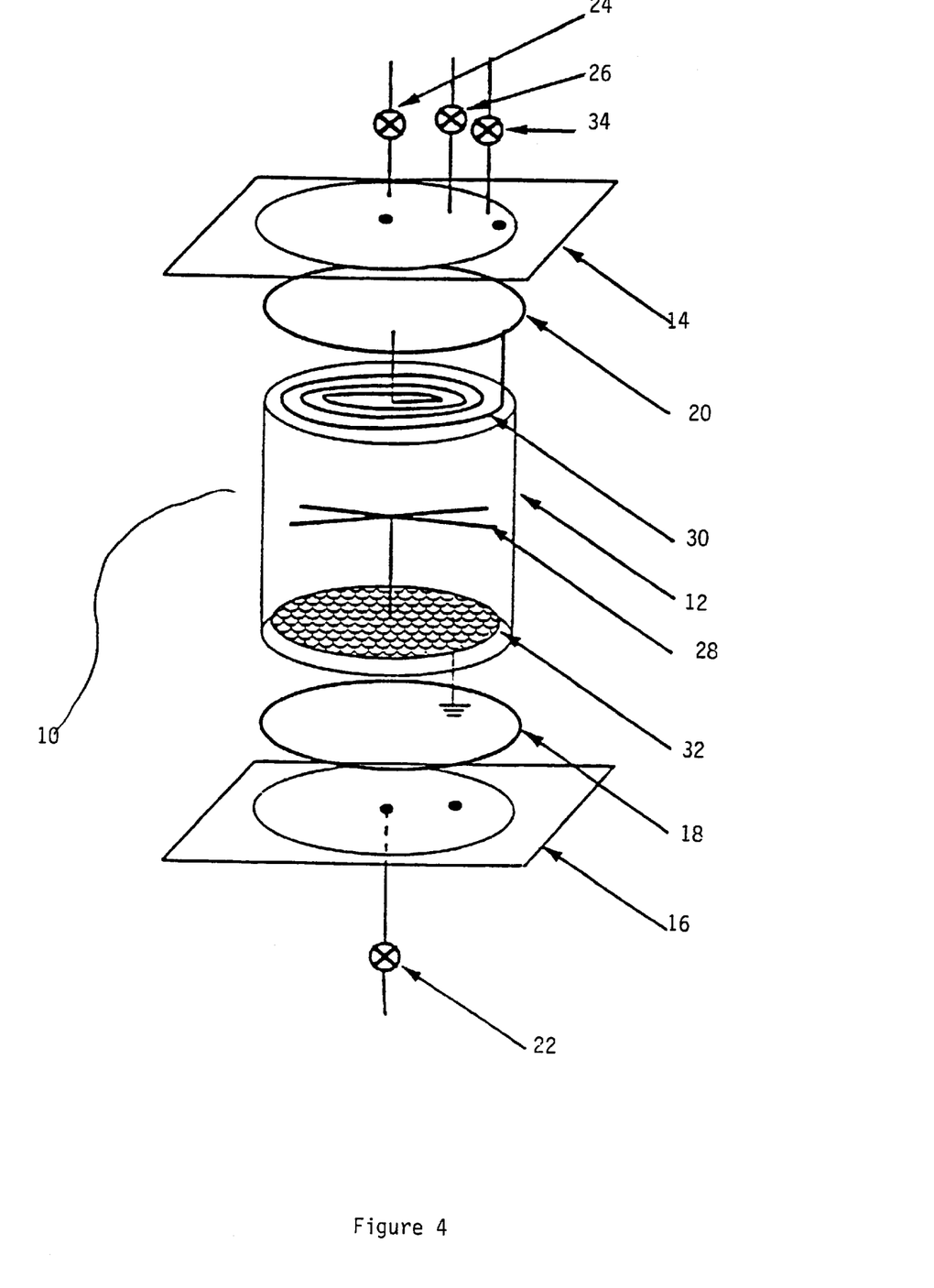
FIG. 4 is an exploded view of a coalescence cell.

FIG. 4 shows a vertically-oriented, cylindrical coalescer cell (10) with an approximate capacity of 2.0 liters. The cell was constructed of glass wall (12) having upper and lower Teflon endplates (14, 16) with Viton o-rings (18, 20) therebetween. The dimensions of the coalescer are listed in Table 3. The lower part of the glass cell was charged with the aqueous phase (tap water) through the water phase valve (22) and the upper part with the unmixed petroleum phase through the oil phase valve (24). The emulsion was pumped from the feed tank through loading valve (26), which adjacent to vent valve (34) into a Teflon distributor system (28) located near the interface of the two phases. At the top of the cell, submerged in the oil phase, was a coiled, insulated wire electrode (30) as used previously by Figueroa (C. E. Figueroa, Electrostatic Separation of Liquid Dispersions: A Working Model and Application to Guayule Processing Technology, Ph.D. Dissertation, Texas A&M University, College Station, Tex., (1993), which is incorporated herein by reference). A perforated flat plate (32) acting as the the ground plate was situated near the bottom of the cell in the aqueous phase.

TABLE 3

Coalescer Dimensions

| Component | Dimension |
|---|---|
| Diameter | 15 cm |
| Length | 11 cm |
| Volume | 1.94 L |
| Separation between electrodes | 8 cm |
| Distance from hot electrode to the interface | 3.5 cm |
| Height of interface from bottom plate | 5.5 cm |

Figure 5:
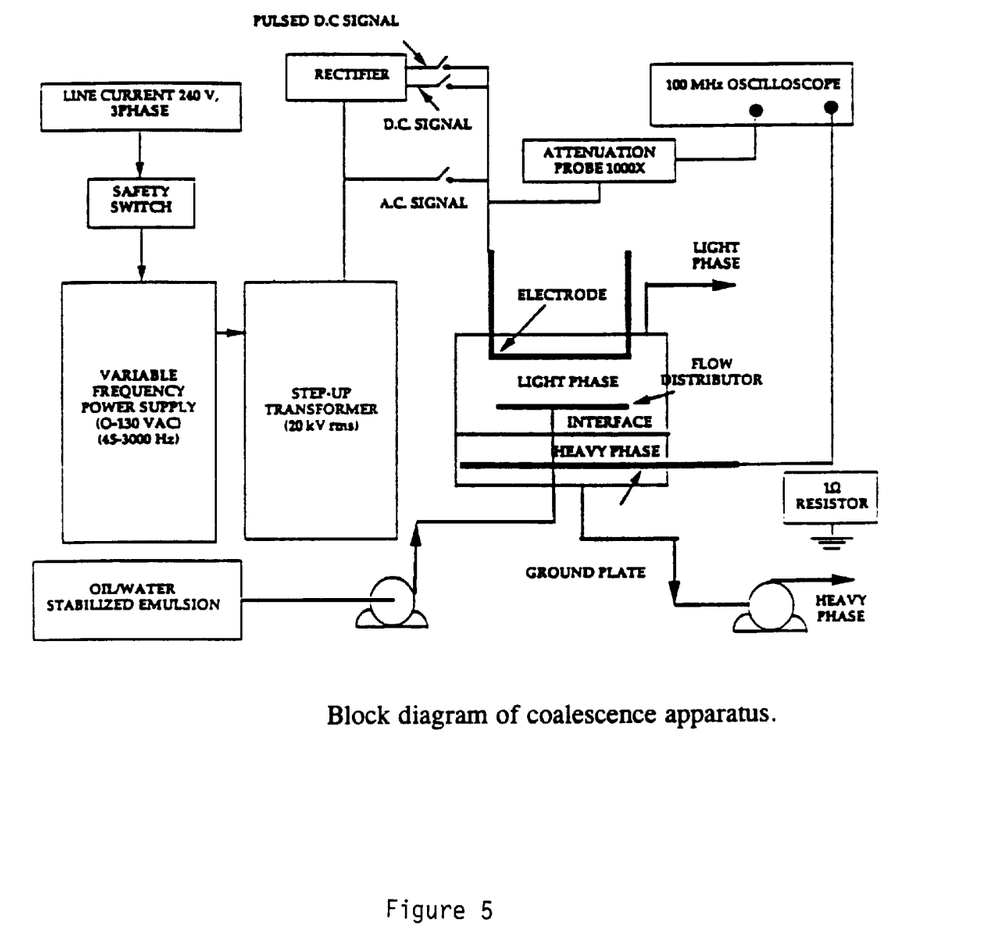
FIG. 5 is a block diagram of the coalescence apparatus.

An electrical potential gradient was applied across the electrodes 30 and 32, causing the emulsion to coalesce, the oil phase moving into the upper organic phase, and the water dropping into the aqueous phase. The potential was supplied by two Elgar 3001 AC variable power supplies which can deliver DC or AC current in a variety of waveforms and at various voltage and frequency settings. Electrical interlocks and other safety features were used to minimize the risk of an electrical shock. A detailed explanation of the coalescer can be found in Figueroa (C. E. Figueroa, Electrostatic Separation of Liquid Dispersions: A Working Model and Application to Guayule Processing Technology, Ph.D. Dissertation, Texas A&M University, College Station, Tex., (1993)). For the following tests, only AC current was used at a setting of 1000 Hz, and the voltage was varied between 10 kV–35 kV (peak to peak) for each emulsion experiment. A block diagram of the coalescence apparatus is shown in FIG. 5.

With the electric field fully established, the emulsion was pumped into the coalescer through the loading valve with a gradually increasing flow, until an equilibrium volume of unresolved dispersion was detected. The equilibrium volume was observed in the height of the emulsion layer. Equilibrium conditions were said to exist at the flow/coalescence rate where the emulsion just began to cover the unmixed interfacial phases. Manually operated control valves on the inlet and outlet flows were used to attain this equilibrium. At equilibrium, the rate for total separation was determined by measuring the outlet flows of oil and water in graduated cylinders over measured lengths of time.

For the Nigerian crude oil emulsion, a large dose of additive was used (a TAC of 1300 ppm) to determine the feasibility of electrical conductivity modification on the coalescence of crude oil emulsions. Such a high level was used because of the high initial conductivity of this of crude. However, the actual active ingredient concentration was approximately 130 ppm and the activity of the conductivity modifier had decreased by roughly 40% due to aging (i.e., oxidation) per the manufacturer directions. For the Shell Brunei crude, a TAC of 30 and 100 ppm was used, which corresponds to an active ingredient concentration of only 3 and 10 ppm.

Figure 6:
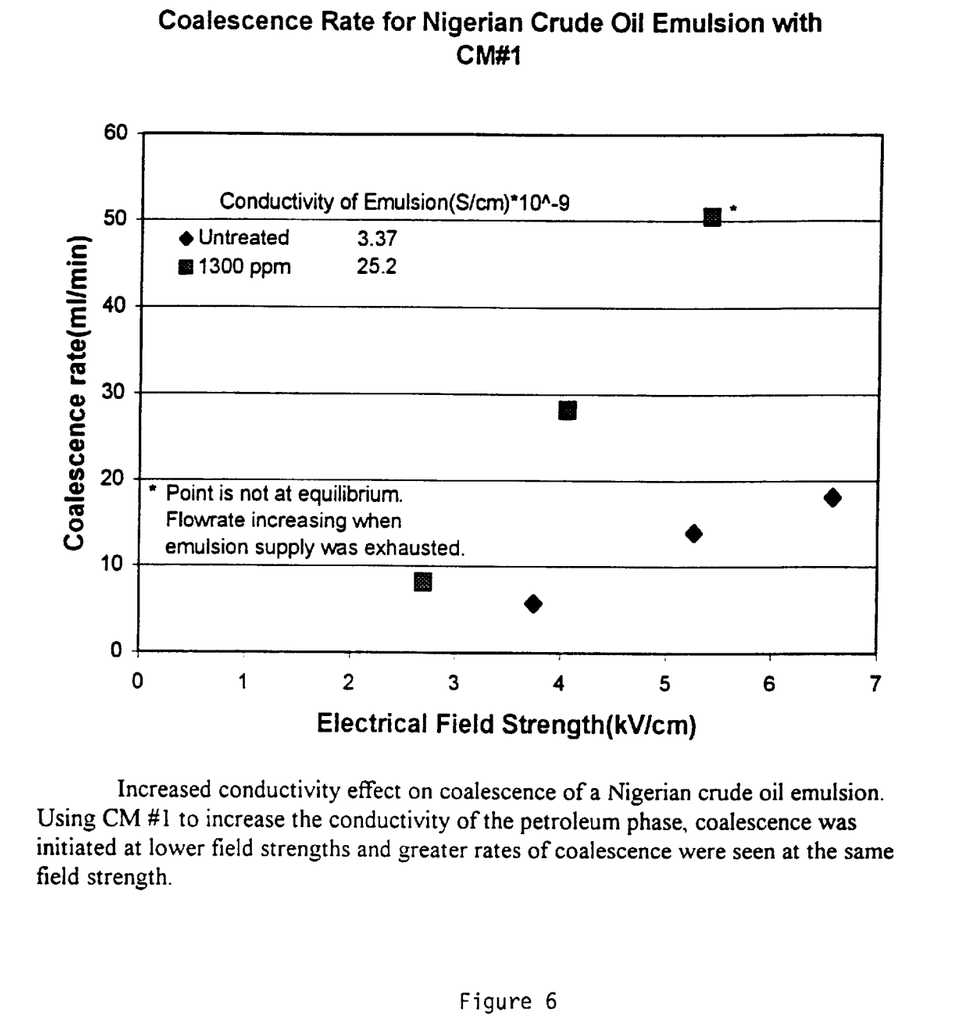
FIG. 6 is a plot graph depicting the effect of CM1 on the rate of oil phase disengagement as a function of electric field strength for a Nigerian crude oil emulsion (83% oil: 17% water by volume).
Figure 7:
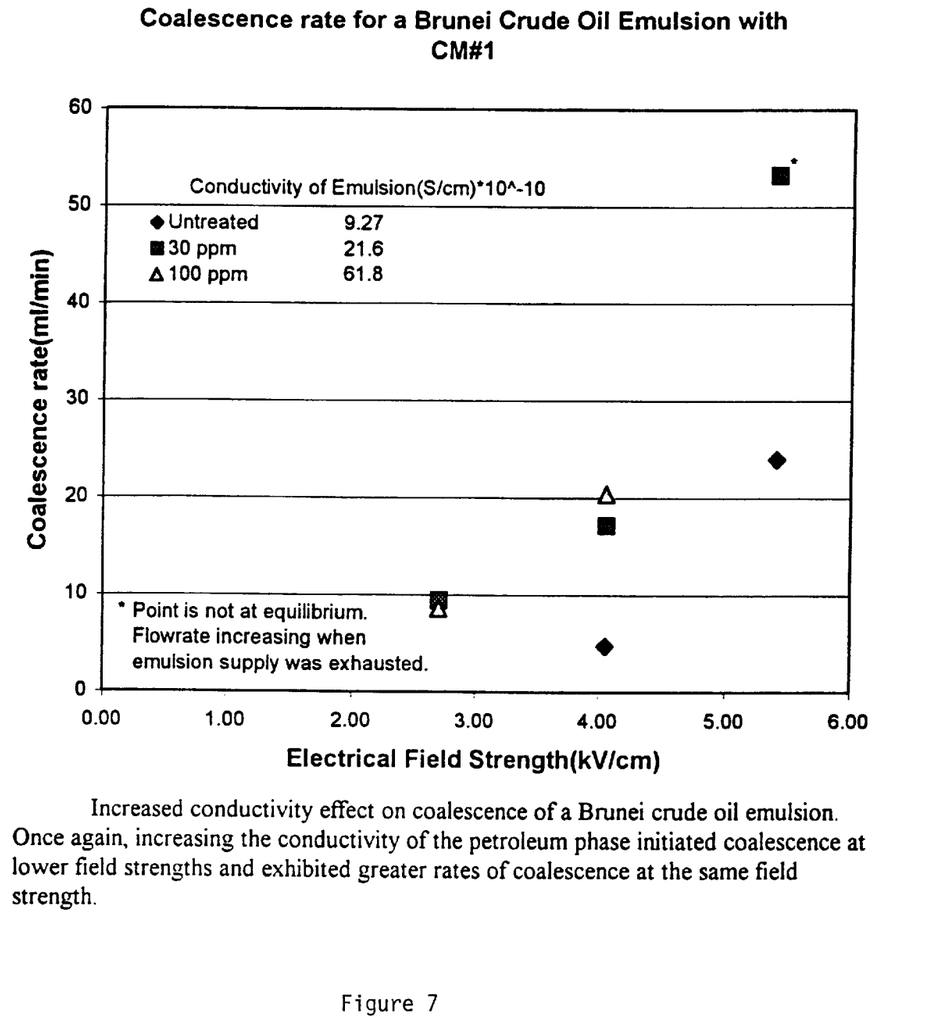
FIG. 7 is a plot graph depicting the effect of CM1 on the rate of oil phase disengagement as a function of electric field strength for a Shell Brunei crude oil emulsion (83% oil: 17% water by volume).

The results of the addition of CM#1 on the Nigerian and Shell Brunei crude oil emulsions are shown in FIGS. 6 and 7, respectively. The Flowrate (ml/min) and electrical field strength (kV/cm) measurements were plotted to compare conductivity effects on electrostatic coalescence rate of the water-in-oil emulsions. Readily apparent from FIG. 6, the electrostatic coalescence rate increased by a factor of 500% when the conductivity of the emulsion was increased roughly by an order of magnitude ($25.2 \times 10^{-9}$ versus $3.17 \times 10^{-9}$ S/cm). The results of the Shell Brunei crude oil emulsion shown in FIG. 7 illustrate that smaller doses of conductivity modifier brought about the same type results. The coalescence rate increased 300% when the conductivity of the emulsion was increased less than an order of magnitude (61.8 & $21.6 \times 10^{-10}$ versus $9.27 \times 10^{-10}$ S/cm). However, as previously stated, the active ingredient concentration was actually 10% less than TAC since only 10% of the conductivity modifier is the active agent with the remainder being an inert solvent. The actual concentration of the conductivity modifier for the Nigerian crude oil emulsion was in fact 130 ppm, and not 1300 ppm. Thus, FIGS. 6 and 7 demonstrate that increased coalescence rates are achieved by increasing the conductivity of the emulsion in accordance with the present invention.

We claim:

1. A method for increasing coalescence during electrostatic separation of a water-in-oil emulsion or dispersion, which comprises:

measuring the electrical conductivity of the hydrocarbon phase material of said emulsion, wherein said hydrocarbon phase material has an initial conductivity of $1 \times 10^{-14}$ to $1 \times 10^{-8}$ Siemens/centimeter;

increasing the electrical conductivity of said emulsion or dispersion with an effective amount of an electrically conductive agent; and applying an electric field across said emulsion or dispersion thereby facilitating coalescence.

2. The method of claim 1, wherein said electrically conductive agent is soluble in the hydrocarbon phase.

3. The method of claim 2, wherein said electrically conductive agent is a non-particulate.

4. The method of claim 3, wherein said electrically conductive agent is a surfactant selected from the group consisting of anionic surfactants, cationic surfactant, non-ionic surfactant, amphoteric surfactants, and mixtures thereof.

5. The method of claim 1, wherein said effective amount provides said emulsion or dispersion with an increase in conductivity of at least 25%.

6. The method of claim 5, wherein said conductivity is increased by at least 50%.

7. The method of claim 6, wherein said conductivity is increased by at least 100%.

8. The method of claim 1, wherein said hydrocarbon phase material is crude oil.

9. The method of claim 8, wherein said crude oil is crude oil substantially free of an asphaltine fraction.

10. The method of claim 1, wherein said electrically conductive agent agent is added to the hydrocarbon phase material prior to forming said emulsion.

11. The method of claim 1, wherein said electrically conductive agent is added to the aqueous phase material prior to forming said emulsion.

12. The method of claim 1, wherein said hydrocarbon is an oil-containing sludge.

13. The method of claim 1, which further comprises heating said emulsion or dispersion.

14. The method of claim 1, which further comprises adding a demulsifier or desalting agent to said emulsion or dispersion.

* * * * *